(12) United States Patent
Takesue et al.

(10) Patent No.: US 6,319,152 B1
(45) Date of Patent: *Nov. 20, 2001

(54) GOLF BALL

(75) Inventors: Rinya Takesue; Yasushi Ichikawa; Shunichi Kashiwagi, all of Chichibu (JP)

(73) Assignee: Bridgestone Sports Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,669

(22) Filed: Jun. 23, 1998

(30) Foreign Application Priority Data

Jun. 23, 1997 (JP) .................................................. 9-181736

(51) Int. Cl.[7] ...................................................... A63B 37/12
(52) U.S. Cl. ........................... 473/371; 473/365; 473/377; 473/378; 528/92 C
(58) Field of Search ........................... 528/92 C; 473/365, 473/377, 378, 371

(56) References Cited

U.S. PATENT DOCUMENTS

| 4,429,076 | * | 1/1984 | Saito et al. ............................. 525/57 |
| 5,688,191 | * | 11/1997 | Cavallaro et al. .................... 473/373 |
| 5,693,711 | * | 12/1997 | Akiba et al. ............................ 525/93 |

* cited by examiner

Primary Examiner—D. S. Nakarani
(74) Attorney, Agent, or Firm—Sughrue, Mion, Zinn, Macpeak & Seas, PLLC

(57) ABSTRACT

A cover stock composed mainly of a heated mixture of a thermoplastic polyurethane elastomer and a styrene base block copolymer is suitable for the manufacture of golf balls. The cover made of the stock offers a very soft feel with little shock, the ease of control and improved scuff resistance.

19 Claims, 1 Drawing Sheet

GOLF BALL

BACKGROUND OF THE INVENTION

1. Field of the Invention

This invention relates to cover stocks for golf balls offering a good feel when hit and having improved scuff resistance. More particularly, it relates to cover stocks suitable for the manufacture of golf balls which offer a very soft feel without exhibiting a shock when hit with a driver and exhibit improved scuff resistance against iron shots without detracting from the ease of control upon approach shots.

2. Prior Art

In prior art golf balls, balata or trans-polyisoprene is often used as the cover stock. Professional and skilled golfers prefer golf balls using balata as the cover stock, because the balata cover balls are good in feel upon full shots with a driver and the ease of control (or spin susceptibility) upon approach shots.

The balata cover balls, however, have the drawback that the ball surface is marred or fluffed as a consequence of iron shots because the cover surface can be scraped by grooves across the iron club face. In addition, balata is expensive and low in productivity because of the difficulty to mold.

For overcoming these drawbacks of balata, a variety of cover stocks using thermoplastic polyurethane elastomers have been proposed (U.S. Pat. Nos. 3,395,109, 4,248,432, and 4,442,282).

Since thermoplastic polyurethane elastomers used as the cover stock are not only improved in feel and control like balata, but also inexpensive and easy to mold, these elastomers are regarded as an excellent cover stock substitute for the balata material. However, the thermoplastic polyurethane elastomers are still insufficient in scuff resistance upon iron shots. Particularly at low temperatures or in winter, there is a likelihood that the ball surface can be cracked and dimples will be scraped off by the iron club face.

There is a desire to develop a cover stock suitable for the manufacture of high performance golf balls which exhibit improved scuff resistance against iron shots without detracting from the ease of control upon approach shots, and offer a very soft feel without shocks when hit.

SUMMARY OF THE INVENTION

An object of the invention is to provide a novel and improved golf ball cover stock which offers the ease of control upon approach shots and a very soft feel without shocks, and is further improved in scuff resistance against iron shots.

In search of a golf ball cover stock which can offer a pleasant feel and is improved in controllability and scuff resistance, the inventors have found that a golf ball cover stock comprising as a main component a heated mixture of a thermoplastic polyurethane elastomer and a styrene base block copolymer is best suited for achieving the above and other objects.

More particularly, according to the invention, a heated mixture of (1) a thermoplastic polyurethane elastomer, especially a thermoplastic polyurethane elastomer having a Shore D hardness of 35 to 55 and comprising an aliphatic diisocyanate as the diisocyanate component and (2) a styrene base block copolymer having improved compatibility therewith and also serving as a binder, especially a flexible styrene base block copolymer having a JIS-A hardness of 50 to 98 is used as the main component of the golf ball cover stock. Golf balls obtained by enclosing cores with this cover stock receive an appropriate back spin rate upon approach shots and are thus easy to control. In addition, these golf balls substantially solve the problem that as a consequence of iron shots, the cover surface can be scraped by grooves across the iron club face and the ball surface is marred or fluffed. Upon full shots with a driver, the balls offer a very soft feel without a shock and without a shortage of flight distance. Therefore, the cover stock composed mainly of a heated thermoplastic polyurethane elastomer/styrene base block copolymer mixture is significantly improved in function and effect over conventional cover stocks of thermoplastic polyurethane elastomers.

Accordingly, the present invention provides a golf ball cover stock comprising as a main component a heated mixture of a thermoplastic polyurethane elastomer and a styrene base block copolymer.

Preferably, the thermoplastic polyurethane elastomer has a Shore D hardness of 35 to 55, the styrene base block copolymer has a JIS A hardness of 50 to 98, and the heated mixture has a Shore D hardness of 35 to 55. Also preferably, the heated mixture consists of 50 to 99% by weight of the thermoplastic polyurethane elastomer and 50 to 1% by weight of the styrene base block copolymer.

The preferred styrene base block copolymer has been modified with functional groups, typically carboxyl or epoxy groups so that the copolymer may have an acid value of 1 to 15 mg $CH_3ONa$ per gram. In one preferred embodiment, the styrene base block copolymer is a tri-block elastomer consisting of terminal polystyrene blocks and an intermediate block. The intermediate block is preferably composed of polybutadiene, polyisoprene, polyethylene/butylene or polyethylene/propylene. In another preferred embodiment, the styrene base block copolymer is a di-block elastomer consisting of one terminal block of polystyrene and another terminal block of a resin other than the polystyrene. The other terminal block is preferably composed of polybutadiene, polyisoprene, polyethylene/butylene or polyethylene/propylene. The preferred styrene base block copolymer has a styrene contents of 10 to 50% by weight.

The diisocyanate component of the preferred thermoplastic polyurethane elastomer is an aliphatic diisocyanate.

DETAILED DESCRIPTION OF THE INVENTION

Figure 1:
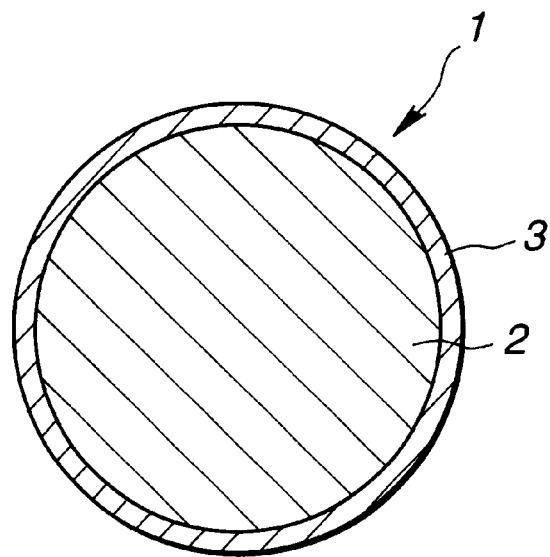
FIG. 1 is a schematic cross-sectional view of a two-piece solid golf ball according to one embodiment of the invention.

The cover stock for golf balls according to the invention uses as a main component a heated mixture of a thermoplastic polyurethane elastomer and a styrene base block copolymer.

The thermoplastic polyurethane elastomer used herein has a molecular structure consisting of a high molecular weight polyol compound constituting a soft segment, a monomolecular chain extender constituting a hard segment, and a diisocyanate.

The high molecular weight polyol compound is not critical and may be any of polyester polyols, polyol polyols, polyether polyols, copolyester polyols, and polycarbonate polyols. Exemplary polyester polyols include polycaprolactone glycol, poly(ethylene-1,4-adipate) glycol, and poly (butylene-1,4-adipate) glycol; an exemplary copolyester polyol is poly(diethylene glycol adipate) glycol; an exemplary polycarbonate polyol is (hexanediol-1,6-carbonate) glycol; and an exemplary polyether polyol is polyoxytetramethylene glycol. Their number average molecular weight is about 600 to 5,000, preferably 1,000 to 3,000.

As the diisocyanate, aliphatic diisocyanates are preferably used in consideration of the yellowing resistance of the cover. Examples include hexamethylene dissocyanate (HDI), 2,2,4- or 2,4,4-trimethylhexamethylene diisocyanate (TMDI), and lysine diisocyanate (LDI). HDI is especially preferred for its compatibility with another resin upon blending.

The monomolecular chain extender is not critical and may be selected from conventional polyhydric alcohols and amines. Examples include 1,4-butylene glycol, 1,2-ethylene glycol, 1,3-propylene glycol, 1,6-hexylene glycol, 1,3-butylene glycol, dicyclohexylmethylmethanediamine (hydrogenated MDA), and isophoronediamine (IPDA).

Of the thermoplastic polyurethane elastomers, those having a Shore D hardness of 35 to 55, especially 40 to 55 are preferred. With a Shore D hardness of less than 35, the ball would receive an increased spin rate and thus travel short when hit with a driver. With a Shore D hardness of more than 55, the cover would be insufficiently soft and adversely affect the feel and control when hit. The specific gravity of the thermoplastic polyurethane elastomer is not critical and may be adjusted as appropriate insofar as the objects of the invention are achievable. Preferably the specific gravity is from 1.0 to 1.3, especially 1.1 to 1.25.

As the thermoplastic polyurethane elastomer, there may be used commercially available ones whose diisocyanate component is aliphatic, for example, Pandex T7298, EX7895, and T7890 (by Dai-Nippon Ink & Chemicals K.K.).

The styrene base block copolymer should preferably have a JIS-A hardness of 50 to 98, more preferably 55 to 97. With a JIS-A hardness of less than 50, the ball would receive an increased spin rate and thus travel a short distance when hit with a driver. With a JIS-A hardness of more than 98, the cover would be insufficiently soft and adversely affect the feel and control when hit.

The styrene base block copolymer may be or may not be modified with functional groups. For compatibility with the thermoplastic polyurethane elastomer, styrene base block. copolymers modified with functional groups are preferred. Exemplary functional groups are carboxyl and epoxy groups.

Preferably the styrene base block copolymers modified with functional groups have an acid value of 1 to 15 mg $CH_3ONa$ per gram and more preferably 2 to 10 mg $CH_3ONa$ per gram as measured by titration assay. A styrene base block copolymer with an acid value of less than 1 mg $CH_3ONa$ per gram would react a very little with the thermoplastic polyurethane elastomer and be less dispersible. A styrene base block copolymer with an acid value of more than 15 mg $CH_3ONa$ per gram would react too much with the thermoplastic polyurethane elastomer so that the mixture might flow less and be difficult to mold.

The styrene base block copolymers are block copolymers having polystyrene (S) at both ends. Depending on their intermediate block which is polybutadiene (B), polyisoprene (I) or hydrogenated poly(ethylene-butylene) (EB), they are basically divided into three types abbreviated as SBS, SIS and SEBS.

As described just above, the styrene base block copolymers are preferably tri-block elastomers consisting of terminal polystyrene blocks and an intermediate block although di-block elastomers consisting of one terminal block of polystyrene and another terminal block of a resin other than the polystyrene are acceptable.

In the case of tri-block elastomers, the intermediate block is preferably composed of a resin selected from polybutadiene, polyisoprene, polyethylene/butylene, and polyethylene/propylene. In the case of di-block elastomers, the other terminal block is preferably composed of a resin selected from polybutadiene, polyisoprene, polyethylene/butylene, and polyethylene/propylene.

The preferred styrene base block copolymer has a styrene content of 10 to 50% by weight, especially 15 to 50% by weight. With a styrene content of less than 10% by weight, the resulting cover would be too soft so that the ball might receive an increased spin rate and thus travel a shorter distance when hit with a driver. With a styrene content of more than 50% by weight, the resulting cover would be insufficiently soft to improve the feel and control of the ball.

The styrene base block copolymers modified with functional groups are commercially available. For example, styrene-ethylene/butylene-styrene copolymers (SEBS) modified with carboxyl or epoxy groups are available under the trade name "Tuftec M" series from Asahi Chemicals K.K. The styrene base block copolymers which are not modified with functional groups are also commercially available, for example, under the trade name of Tafupuren 315, Asapuren T420 and Tuftec H1051 from Asahi Chemicals K.K.

The golf ball cover stock of the invention is obtained by mixing a thermoplastic polyurethane elastomer with a styrene base block copolymer and heating the mixture until the desired properties are achieved. The preferred mixing proportion is 50 to 99% by weight of the thermoplastic polyurethane elastomer and 50 to 1% by weight of the styrene base block copolymer, and especially 50 to 95% by weight of the thermoplastic polyurethane elastomer and 50 to 5% by weight of the styrene base block copolymer. A thermoplastic polyurethane elastomer content of less than 50% by weight would lead to poor flight performance. With a thermoplastic polyurethane elastomer content of more than 99% by weight, the cover would be low in scuff resistance, failing to produce a satisfactory golf ball.

The method of mixing and heating these components is not critical. In general, using internal mixers such as kneading twin-screw extruders, Banbury mixers and kneaders, the components are mixed and heated at a temperature of about 150 to 250° C. for about ½ to 15 minutes. In the mixing and heating step, the two resin components may be mixed and heated before the mixture is further mixed with other additives. Alternatively, the two resin components and other additives are mixed and heated together to form a cover stock composition.

The heated mixture of a thermoplastic polyurethane elastomer and a styrene base block copolymer should preferably have a Shore D hardness of 35 to 55, and more preferably 45 to 55. With a Shore D hardness of less than 35, the resulting cover would become so soft that the ball might receive an increased spin rate and thus travel a short distance when hit with a driver. With a Shore D hardness of more than 55, the resulting golf ball would fail to receive an appropriate back spin rate upon approach shots and become difficult to control. The heated mixture should preferably have a specific gravity of 0.9 to 1.2, and more preferably 1.0 to 1.2.

In the present invention, the heated mixture of a thermoplastic polyurethane elastomer and a styrene base block copolymer constitutes the main component of the golf ball cover stock. The main component encompasses both the resin component of the cover stock consisting solely of the heated mixture and the resin component of the cover stock containing another resin or resins in addition to the heated mixture.

Where the resin component of the cover stock consists solely of the heated mixture of a thermoplastic polyurethane elastomer and a styrene base block copolymer, non-resinous components such as titanium dioxide and barium sulfate are added in minor amounts. Then the Shore D hardness of the cover stock is substantially equal to that of the heated mixture of a thermoplastic polyurethane elastomer and a styrene base block copolymer.

Where the resin component of the cover stock contains another resin or resins in addition to the heated mixture, ionomer resins, thermoplastic polystyrene elastomers and thermoplastic polyester elastomers may be used as the other resin. The other resin is blended in appropriate amounts insofar as the properties of the heated mixture are not adversely affected. Preferably, the heated mixture of the two resin components according to the invention accounts for at least 70% by weight, more preferably at least 80% by weight of the cover stock resin component.

In either case, various additives, for example, pigments, dispersants, antioxidants, UV absorbers and photostabilizers may be added to the heated mixture, if necessary.

The golf ball cover stock of the invention is applicable to either wound golf balls or solid golf balls such as two- and three-piece solid golf balls.

The embodiment wherein the invention is applied to solid golf balls is first described. Referring to FIG. 1, there is illustrated in cross section a two-piece solid golf ball 1. The ball 1 is prepared by enclosing a solid core 2 with a cover 3 of the inventive cover stock. The solid core 2 may be either a core of single layer structure or a core of two or multi-layer structure. If desired, an intermediate layer may be disposed between the core and the cover. A plurality of dimples are formed on the cover surface though not shown.

For example, the solid core for two-piece balls is referred to. The solid core 2 may be prepared by blending 100 parts by weight of cis-1,4-polybutadiene with 10 to 60 parts by weight of a vulcanizing or crosslinking agent composed of an α,β-monoethylenically unsaturated carboxylic acid such as acrylic acid or methacrylic acid or a metal salt thereof, a functional monomer such as trimethylol-propane methacrylate, or a mixture thereof, 10 to 30 parts by weight a filler such as zinc oxide or barium sulfate, 0.5 to 5 parts by weight of a peroxide such as dicumyl peroxide, and optionally 0.1 to 1 part by weight of an antioxidant to form a rubber composition, and press molding and vulcanizing (or crosslinking) the rubber composition, for example, by heating under pressure at 140 to 170° C. for 10 to 40 minutes, thereby forming a spherical vulcanized part. The weight, diameter, hardness and other parameters of the solid core may be adjusted as appropriate insofar as the objects of the invention are achievable.

Figure 2:
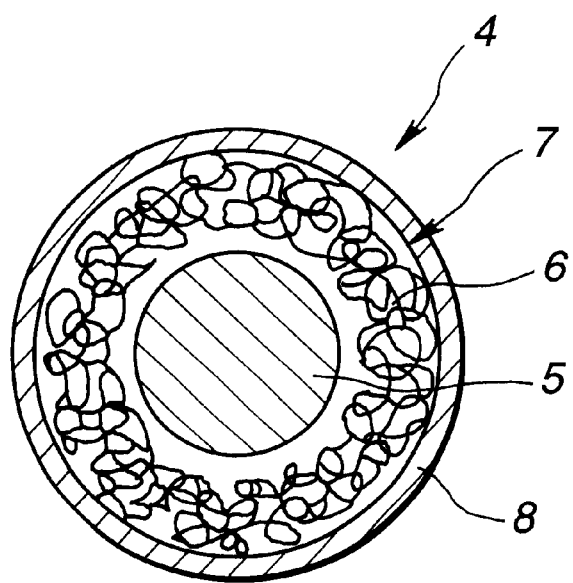
FIG. 2 is a schematic cross-sectional view of a wound golf ball according to another embodiment of the invention.

Referring to FIG. 2, the embodiment wherein the invention is applied to wound golf balls is described. Thread rubber is wound around a center 5 (which is a solid center in FIG. 2) to form a thread rubber layer 6, yielding a wound core 7. The wound core 7 is enclosed with a cover 8 of the inventive cover stock. A plurality of dimples are formed on the cover surface though not shown.

The center 5 is not critical and may be a conventional one. It may be either a liquid center or a solid center (typically a rubbery center). The solid center may be obtained by vulcanizing the same rubber composition as described for the solid core of the two-piece golf ball.

The thread rubber layer 6 is formed by winding around the center 5 thread rubber under stretched conditions. The thread rubber used herein may be a conventional one, for example, one obtained by vulcanizing a rubber composition comprising natural rubber or synthetic polyisoprene, antioxidant, vulcanizing accelerator, sulfur, etc. The winding of rubber thread may be done by a well-known method. The weight, diameter, hardness and other parameters of the wound core may be adjusted as appropriate insofar as the objects of the invention are achievable.

The method of enclosing a core with the cover stock of the invention is not critical. Well-known methods are employable. For example, a golf ball may be prepared by preforming hemispherical shells from the cover stock composed mainly of a heated mixture of a thermoplastic polyurethane elastomer and a styrene base block copolymer, enclosing a core with a pair of preformed shells, and effecting compression molding at about 130 to 170° C. for about 1 to 5 minutes. Alternatively, the molten cover stock is directly injection molded over a core.

The gage of the cover may be properly adjusted insofar as the objects of the invention are achievable. Usually the cover has a gage of 1 to 4 mm, especially 1.3 to 2.1 mm. The cover is not limited to a single layer and may be formed from two or more layers.

The diameter and weight of the ball are properly determined in accordance with the Rules of Golf. During or after the molding of the cover, dimples are usually formed on the ball surface. If necessary, the molding of the cover is followed by paint finishing and stamping.

There has been described a golf ball cover stock which offers a very soft feel without a shock, the ease of control and improved scuff resistance.

EXAMPLE

Examples of the invention are given below by way of illustration and not by way of limitation.

EXAMPLES 1–11 and Comparative Examples 1–2

Solid cores having a diameter of 38.6 mm, a weight of 34.1 grams and a hardness corresponding to a distortion of 3.0 mm under an applied load of 100 kg were prepared using a core composition containing cis-1,4-polybutadiene as a main component.

Next, a cover blend of the formulation shown in Tables 1 and 2 was mixed in a kneading twin-screw extruder, extruded and comminuted into pellets. In this way, cover stock compositions of Examples 1–11 and Comparative Examples 1–2 were obtained in pellet form. The specific gravity and Shore D hardness of the cover stock compositions are also shown in Tables 1 and 2.

The cover stock compositions were injection molded over the cores to a gage of 2.0 mm, producing two-piece solid golf balls of Examples 1–11 and Comparative Examples 1–2.

The golf balls were examined for weight, hardness, initial velocity, scuff resistance and hitting feel by the following tests. The results are shown in Tables 3 and 4.

Hardness

Ball hardness was expressed by a distortion (mm) of a ball under an applied load of 100 kg.

Initial velocity

An initial velocity (m/s) was measured by an initial speed meter of the same type as prescribed by USGA.

Scuff resistance

Using a swing robot machine having a pitching wedge mounted, the ball was hit at a head speed of 33 m/s. The surface state of the ball after hitting was rated on a 5-point scale by a panel of ten observers. The rating is an average of ten ratings.

5: ball surface intact, or very slight club face dents

4: some club face dents, but no fluff on the cover surface

3: some club face dents, fluffy cover surface

2: fluffy cover surface, cracks

1: dimples scraped off

Hitting feel

With a driver (#1W) PRO 230 Titan (loft angle 11°, shaft Harmotec Lite HM50J(HK), hardness S, balance D2, by Bridgestone Sports Co., Ltd.), an actual hitting test was performed by a panel of ten golfers with a head speed of 45 m/sec (HS45). The ball was rated according to the following criterion.

⊚: excellent (very soft feel with little shock)

○: good (soft feel with little shock)

Δ: average

X: poor (heavy shocks)

TABLE 1

|  | E1 | E2 | E3 | E4 | CE1 |
|---|---|---|---|---|---|
| Pandex T7298 | 80.0 | 80.0 | 80.0 | 80.0 | 100.0 |
| Tuftec M1953 | 20.0 | — | — | — | — |
| Tuftec M1913 | — | 20.0 | — | — | — |
| Tafupuren 315 | — | — | 20.0 | — | — |
| Asapuren T420 | — | — | — | 20.0 | — |
| Titanium dioxide | 1.0 | 1.0 | 1.0 | 1.0 | 1.0 |
| Magnesium stearate | 1.0 | 1.0 | 1.0 | 1.0 | 1.0 |
| Specific gravity | 1.12 | 1.12 | 1.12 | 1.12 | 1.18 |
| Hardness (Shore D) | 47 | 45 | 41 | 42 | 48 |

TABLE 2

|  | E5 | E6 | E7 | E8 | E9 | E10 | E11 | CE2 |
|---|---|---|---|---|---|---|---|---|
| Pandex T7298 | 93.3 | 86.7 | 80.0 | 93.3 | 86.7 | 80.0 | 80.0 | 100.0 |
| Tuftec M1953 | 6.7 | 13.3 | 20.0 | — | — | — | — | — |
| Tuftec H1051 | — | — | — | 6.7 | 13.3 | 20.0 | — | — |
| Tafupuren 126 | — | — | — | — | — | — | 20.0 | — |
| Magnesium stearate | 1.0 | 1.0 | 1.0 | 1.0 | 1.0 | 1.0 | 1.0 | 1.0 |
| Titanium dioxide | 1.0 | 1.0 | 1.0 | 1.0 | 1.0 | 1.0 | 1.0 | 1.0 |
| Specific gravity | 1.16 | 1.14 | 1.12 | 1.16 | 1.14 | 1.12 | 1.12 | 1.18 |
| Hardness (Shore D) | 48 | 48 | 48 | 47 | 47 | 44 | 45 | 48 |

Pandex T7298: non-yellowing thermoplastic polyurethane elastomer, Dai-Nippon Ink & Chemicals K.K.
Tuftec M1953: styrene-ethylene/butylene-styrene block copolymer modified with carboxyl groups, acid value 10 mg $CH_3ONa$/g, JIS-A hardness 96, Asahi Chemicals K.K.
Tuftec M1913: styrene-ethylene/butylene-styrene block copolymer modified with carboxyl groups, acid value 10 mg $CH_3ONa$/g, JIS-A hardness 84, Asahi Chemicals K.K.
Tafupuren 315: styrene-butadiene-styrene block copolymer, JIS-A hardness 62, Asahi Chemicals K.K.
Asapuren T420: styrene-butadiene-styrene block copolymer, JIS-A hardness 75, Asahi Chemicals K.K.
Tuftec H1051: styrene-ethylene/butylene-styrene block copolymer, JIS-A hardness 96, Asahi Chemicals K.K.
Tafupuren 126: styrene-butadiene-styrene block copolymer, JIS-A hardness 91, Asahi Chemicals K.K.

TABLE 3

|  | E1 | E2 | E3 | E4 | CE1 |
|---|---|---|---|---|---|
| Ball weight (g) | 45.0 | 45.2 | 45.3 | 45.3 | 45.7 |
| Ball hardness (mm) | 2.74 | 2.87 | 2.82 | 2.79 | 2.71 |
| Initial velocity (m/s) | 75.3 | 75.2 | 75.3 | 75.3 | 75.5 |
| Scuff resistance | 5.0 | 4.7 | 4.5 | 4.5 | 3.9 |
| Feel | ⊚ | ⊚ | ⊚ | ⊚ | ○ |

TABLE 4

|  | E5 | E6 | E7 | E8 | E9 | E10 | E11 | CE2 |
|---|---|---|---|---|---|---|---|---|
| Ball weight (g) | 45.6 | 45.4 | 45.3 | 45.8 | 45.4 | 45.3 | 45.3 | 45.8 |
| Ball hardness (min) | 2.73 | 2.74 | 2.74 | 2.71 | 2.66 | 2.77 | 2.76 | 2.67 |
| Initial velocity (m/s) | 75.4 | 75.3 | 75.3 | 75.5 | 75.5 | 75.3 | 75.4 | 75.5 |
| Scuff resistance | 3.9 | 4.0 | 4.1 | 4.0 | 4.0 | 3.8 | 4.4 | 3.6 |
| Feel | ⊚ | ⊚ | ⊚ | ⊚ | ⊚ | ⊚ | ⊚ | ○ |

It is evident from Tables 3 and 4 that balls using cover stocks based on heated mixtures of a thermoplastic polyurethane elastomer and a styrene base block copolymer give a very soft feel with little shock when hit and are improved in scuff resistance, as compared with cover stocks consisting essentially of a thermoplastic polyurethane elastomer (Comparative Examples 1 and 2).

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A solid golf ball comprising: a solid core and a cover, wherein a core composition for the solid core contains cis-1,4-polybutadiene as a main component, the cover having a gage in the range of 1 to 4 mm and the polymer stock for the cover consist of a mixture of a thermoplastic polyurethane elastomer and a styrene base block copolymer, said thermoplastic polyurethane elastomer having a Shore D hardness in the range of 35 to 55, said styrene base block copolymer having a JIS A hardness of 50 to 98, and said mixture having a Shore D hardness in the range of 35 to 55.

2. The golf ball of claim 1 wherein said mixture consists of 50 to 99% by weight of the thermoplastic polyurethane elastomer and 50 to 1% by weight of the styrene base block copolymer.

3. The golf ball of claim 1 wherein said styrene base block copolymer has been modified with functional groups.

4. The golf ball of claim 3 wherein said styrene base block copolymer has been modified with carboxyl or epoxy groups and has an acid value of 1 to 15 mg $CH_3ONa$ per gram.

5. The golf ball of claim 1 wherein said styrene base block copolymer is a tri-block elastomer consisting of terminal polystyrene blocks and an intermediate block.

6. The golf ball of claim 5 wherein said intermediate block is composed of a resin selected from the group consisting of polybutadiene, polyisoprene, polyethylene/butylene, and polyethylene/propylene.

7. The golf ball of claim 1 wherein said styrene base block copolymer is a di-block elastomer consisting of one terminal block of polystyrene and another terminal block of a resin other than the polystyrene.

8. The golf ball of claim 7 wherein the other terminal block is composed of a resin selected from the group consisting of polybutadiene, polyisoprene, polyethylene/butylene, and polyethylene/propylene.

9. The golf ball of claim 1 wherein said styrene base block copolymer has a styrene content of 10 to 50% by weight.

10. The golf ball of claim 1 wherein said thermoplastic polyurethane elastomer comprises an aliphatic diisocyanate.

11. The golf ball of claim 1, wherein a mixture of a thermoplastic polyurethane elastomer and a styrene base block copolymer is a mixture obtained by mixing and heating the components at a temperature in the range of 150 to 250° C. for about 0.5 minutes to 15 minutes.

12. The golf ball of claim 1, wherein said styrene base block copolymer has a styrene content of 15 to 50% by weight.

13. The golf ball of claim 1, wherein said thermoplastic polyurethane elastomer has a Shore D hardness in the range of 40 to 55 and said styrene base block copolymer has a JIS A hardness in the range of 55 to 97.

14. The solid golf ball of claim 1 wherein said solid golf ball is a two-piece ball having a solid core and a cover.

15. A solid golf ball of claim 1, wherein the gage of the cover is in the range of 1.3 to 2.1 mm.

16. The solid golf ball of claim 1, which comprises a plurality of layers.

17. A wound golf ball comprising: a wound core having a center and a thread rubber formed by winding around the center and a cover, the cover having a gage in the range of 1 to 4 mm, and the polymer stock for the cover consist of a mixture of a thermoplastic polyurethane elastomer and a styrene base block copolymer, said thermoplastic polyurethane elastomer having a Shore D hardness in the range of 35 to 55, said styrene base block copolymer having a JIS A hardness of 50 to 98, and said mixture having a Shore D hardness in the range of 35 to55.

18. The wound golf ball of claim 17, wherein the gage of the cover is in the range of 1.3 to 2.1 mm.

19. The wound golf ball of claim 17, wherein the cover comprise a plurality of layers.

* * * * *